United States Patent
McClelland, Jr. et al.

(10) Patent No.: US 6,352,573 B2
(45) Date of Patent: Mar. 5, 2002

(54) METHOD FOR THE SEPARATION AND RECYCLING OF HOT FINES IN HOT BRIQUETTING OF REDUCED IRON

(75) Inventors: James M. McClelland, Jr., Cornelius; Stephen C. Montague, Midland; Brian W. Voelker, Concord, all of NC (US)

(73) Assignee: Midrex International B.V. Rotterdam, Zurich (CH)

( * ) Notice: Subject to any disclaimer, the term of this patent is extended or adjusted under 35 U.S.C. 154(b) by 0 days.

(21) Appl. No.: 09/813,633

(22) Filed: Mar. 21, 2001

Related U.S. Application Data

(60) Provisional application No. 60/191,036, filed on Mar. 21, 2000.

(51) Int. Cl.[7] .............................................. C21B 13/00
(52) U.S. Cl. .......................................... 75/436; 266/137
(58) Field of Search ............................ 75/436; 266/137

(56) References Cited

U.S. PATENT DOCUMENTS

| | | |
|---|---|---|
| 3,116,996 A | 1/1964 | Rohaus |
| 3,630,353 A | 12/1971 | Seidel et al. |
| 4,249,906 A | 2/1981 | Howell |
| 4,274,863 A | 6/1981 | Metz |
| 4,917,723 A | 4/1990 | Coyne, Jr. |
| 5,364,446 A | 11/1994 | Batterham et al. |
| 6,074,456 A * | 6/2000 | Freytag et al. ................ 75/436 |

\* cited by examiner

Primary Examiner—Melvyn Andrews
(74) Attorney, Agent, or Firm—Dougherty & Clements LLP

(57) ABSTRACT

A method of separating and recycling shards and fines that occur in a briquetting operation using an non-reactive carrier gas to separate and entrain the hot shards and fines, and conduct them to a material inlet of the briquetting machine, while separating and recycling the carrier gas. Apparatus for carrying out the method is also disclosed.

12 Claims, 3 Drawing Sheets

METHOD FOR THE SEPARATION AND RECYCLING OF HOT FINES IN HOT BRIQUETTING OF REDUCED IRON

CROSS REFERENCE TO RELATED APPLICATION

This application claims the benefit of U.S. Provisional Application No. 60/191,036, filed on Mar. 21, 2000.

FIELD OF INVENTION

This invention relates to an improved method for separating and recycling hot fines, and is especially useful in recycling hot fines produced in the hot briquetting of reduced iron.

BACKGROUND OF THE INVENTION

Hot briquetting of reduced iron consists of feeding the output material of a direct reduced iron (DRI) process, for example, from a direct reduction shaft furnace, into a press in which the material is formed into uniform, pillow-shaped briquettes. The material is substantially metallized with an iron content exceeding 85%. The material temperature at the egress of the furnace depends on the type of furnace used, but is greater than 600° C. in all cases. The material is not cooled before the briquetting operation. The briquettes usually are formed into sheets of connected briquettes. A breaking operation follows the briquetting press so that briquettes abutting and connected in the press are separated at the egress of the briquette process. "Fines" are particles of DRI that consist of shards of small (less than 12 mm) irregular shapes and other particulates that are created in the breaking operation. These fines must be removed from the egress material but are nonetheless valuable DRI material. Therefore, fines must be removed and recycled in any economically feasible method.

The current State of the Art for recovering fines is to pass hot direct reduced iron, DRI briquettes, shards and fines over a vibrating screen through which the small particles fall, then recycle the fines to a briquette feed screw via a bucket elevator. This method involves mechanical equipment and concomitant maintenance problems. For example, when the vibrating screen becomes hot it loses surface hardness, and therefore wears out quickly. Replacement of the screen is expensive and requires process interruption. The hot bucket elevators require excessive maintenance. These bucket elevators have many moving parts which are subject to undesired thermal expansion and creep. Ensuring that the system is hermetic and that only inert gases contact the hot DRI is also a problem with known fines separation and recycling systems. Hot DRI fines are subject to reoxidation and burning, including catastrophic burning or explosion upon exposure to oxygen.

Applicants are aware of the following prior art:

Biscofsheim et al., U.S. Pat. No. 3,630,353, teaches a method for removing fines or dust from broken sinter cake before delivery to a blast furnace. Biscofsheim works by blowing air upward through a perforated bottom wall of a rotating cooler and through the broken sinter thereon. The fines are carried by the air to an exhaust hood and then to a precipitator where the fines are collected and then reintroduced into the sintering machine. Air pressure and air velocity are changed according to the thickness of sinter material and the size of the fines to be collected.

Rohaus, U.S. Pat. No. 3,116,996, teaches a method for handling fines which remain after a briquetting operation without the use of a cyclone or a screen. Rohaus handles fines by blowing the briquettes with air while in a cooling shaft and reintroducing the fines into a kiln. Rohaus does not mention the reduced or oxidized status of the briquettes or fines, but seems more concerned with moisture content. The method utilizes the air, heated by the briquettes, as secondary combustion air within the kiln. The recycled fines are passed only through a final portion of the kiln since the fines are already substantially moisture free. Howell, U.S. Pat. No. 4,249,906, teaches a process for recovering and using fines of flux, such as limestone, used in metallurgical processes. Howell collects airborne fines with a baghouse or a similar piece of equipment and the fines are then transported to a first processing zone. The method of transportation is called 'dense phase collection', a method in which particulate matter is carried by a gas in a manner resembling a fluidized bed. The material is formed into briquettes. The briquettes, fines and larger pieces of flux are temporarily stored. Upon removal from storage the material is abrasively deflashed, then transported to a vibrating screen classifier. Appropriately sized pieces are delivered for processing. Other sizes, both too large and too small are recycled to the briquetting machine.

Metz, U.S. Pat. No. 4,274,863, teaches a method of treating flue gas. Metz describes a single gas treatment station used to clean varying gases from the steel mill before discharge to the environment. The flue gas containing fines and other contaminants is introduced into a sintering plant. The flue gas is introduced with air and incorporated into the combustion reaction inside the sintering plant. Many of the pollutants in the flue gas are oxidized, and the dust in the flue gas is affixed to the sintering material. Pollutants may be selectively added to the sintering process in the location where materials are typically decomposed or removed. For instance, those gas streams containing large amounts of sulfuric components may be introduced into the upstream zone of the sintering bed. Metz also provides that crude dust may be removed before the gas and dust mixture enters the sintering plant.

Coyne, Jr., U.S. Pat. No. 4,917,723, teaches a method for capturing nonferrous materials used in metallurgical processes. The process begins by collecting plant waste including fines, sludge, dust, etc. The captured dust and fines are fed to a briquette press and then to a smelter. The process is repeated so that nonferrous constituent material is repeatedly captured, briquetted, smelted, volatilized, cooled, then captured again. This process continues until the dust has a sufficient percentage of nonferrous material to warrant removal and recovery. The goal of the process is to recycle iron containing material while recovering nonferrous material. This patent applies to direct reduced iron though it is not limited to DRI.

Batterham et al., U.S. Pat. No. 5,364,446, teaches a process for heating solid non-reducible particulate material by carrying it in a hot gas. This process may be used in the production of Portland type cement or may be used to heat carbonate materials for a metallurgical process. The detailed description in the patent uses an off gas to heat a carbonate in preparation for calcination. Problems with stickiness from molten or sticky particles in the off gas are solved by cooling particles slightly or establishing flow patterns to minimize the interaction between particles to be carried by the flue gas and particles already present in the flue gas. The goal of this invention is to heat carbonate material with flue gas with minimal interaction between the carbonate material and the particulate matter in the flue gas.

The present invention differs substantively from the teachings of the above references. The invented process requires that the briquette temperature at the egress of the briquette operation is not substantially lower than the temperature egress of the DRI furnace. Entraining DRI fines at more than 600° C. in air is inoperable since hot DRI readily, possibly explosively, reacts with oxygen. Note that the term "fines" in the present invention is defined as particulate materials, the size of which particles range from less than 0.1 mm dust to 12 mm shards of DRI material.

SUMMARY OF INVENTION

The invention is a method and apparatus for separating and recycling hot DRI fines produced in the hot briquetting of reduced iron. The method pneumatically separates fines from briquettes upon breaking of the briquettes, and pneumatically transports the fines to the material feed inlet of the briquetting machine. This method eliminates the need for a hot screen and for a bucket elevator, both of which require unacceptably high maintenance expense. The invented method utilizes a hermetic system to avoid problems with re-oxidation, such as combustion, or even explosion. It also eliminates the need for a separate dust collection system.

OBJECTS OF THE INVENTION

The principal object of this invention is to provide a mechanically simplified method of separating and recycling fines and shards that occur in the breaker chamber of a briquetting machine.

It is another object of provide a method of recovering waste fines from a briquetting machine when such machine is used for briquetting hot, substantially metallized, iron-bearing materials.

Another object of the invention is to provide an improved method and apparatus for recovering and recycling hot direct reduced iron fines which is reliable and requires low maintenance.

BRIEF DESCRIPTION OF THE DRAWINGS

The foregoing and other objects will become more readily apparent by referring to the following detailed description and the appended drawings, in which.

DETAILED DESCRIPTION

Figure 1:
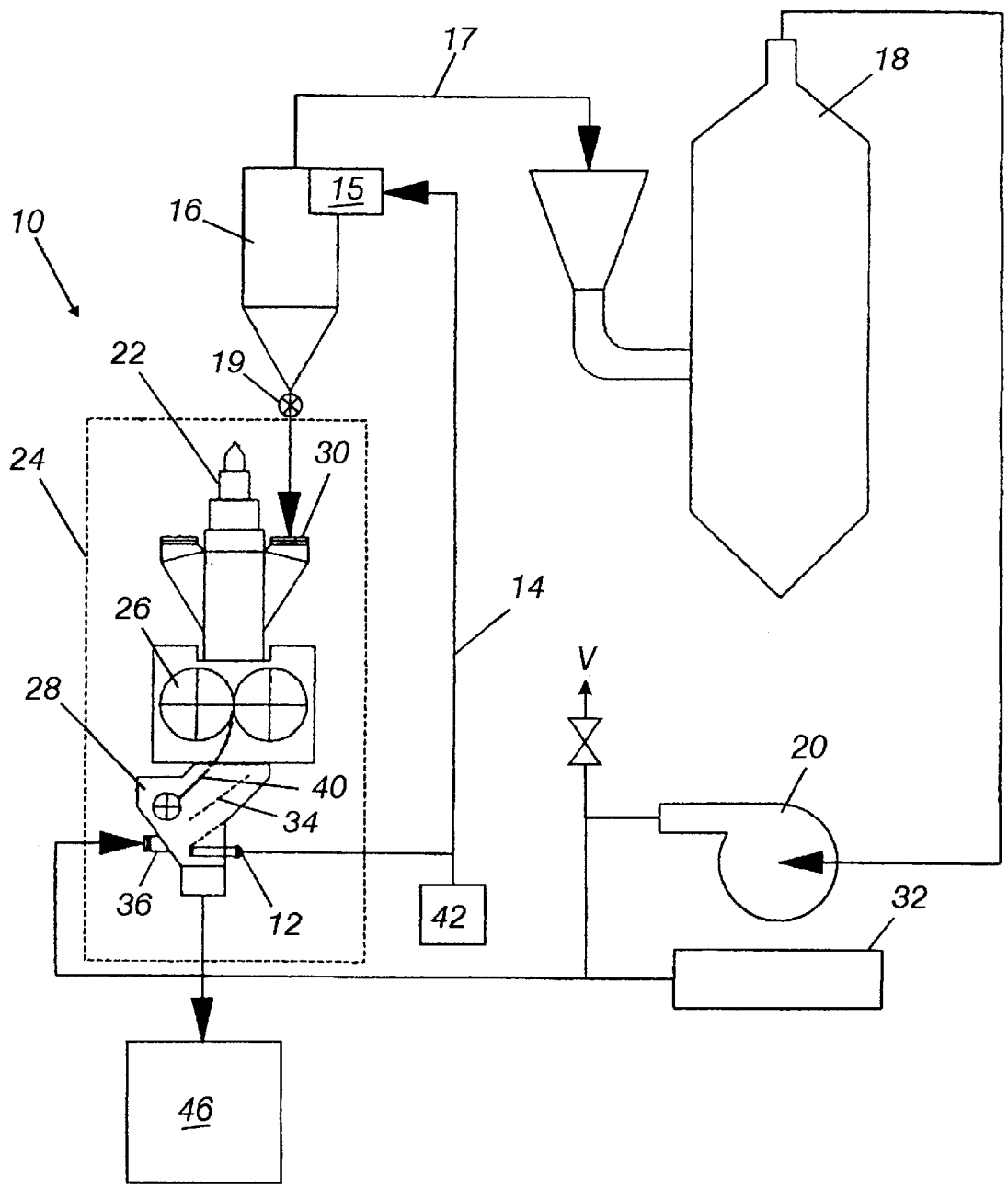
FIG. 1 is a schematic diagram of the apparatus for carrying out the method according to this invention.
Figure 2:
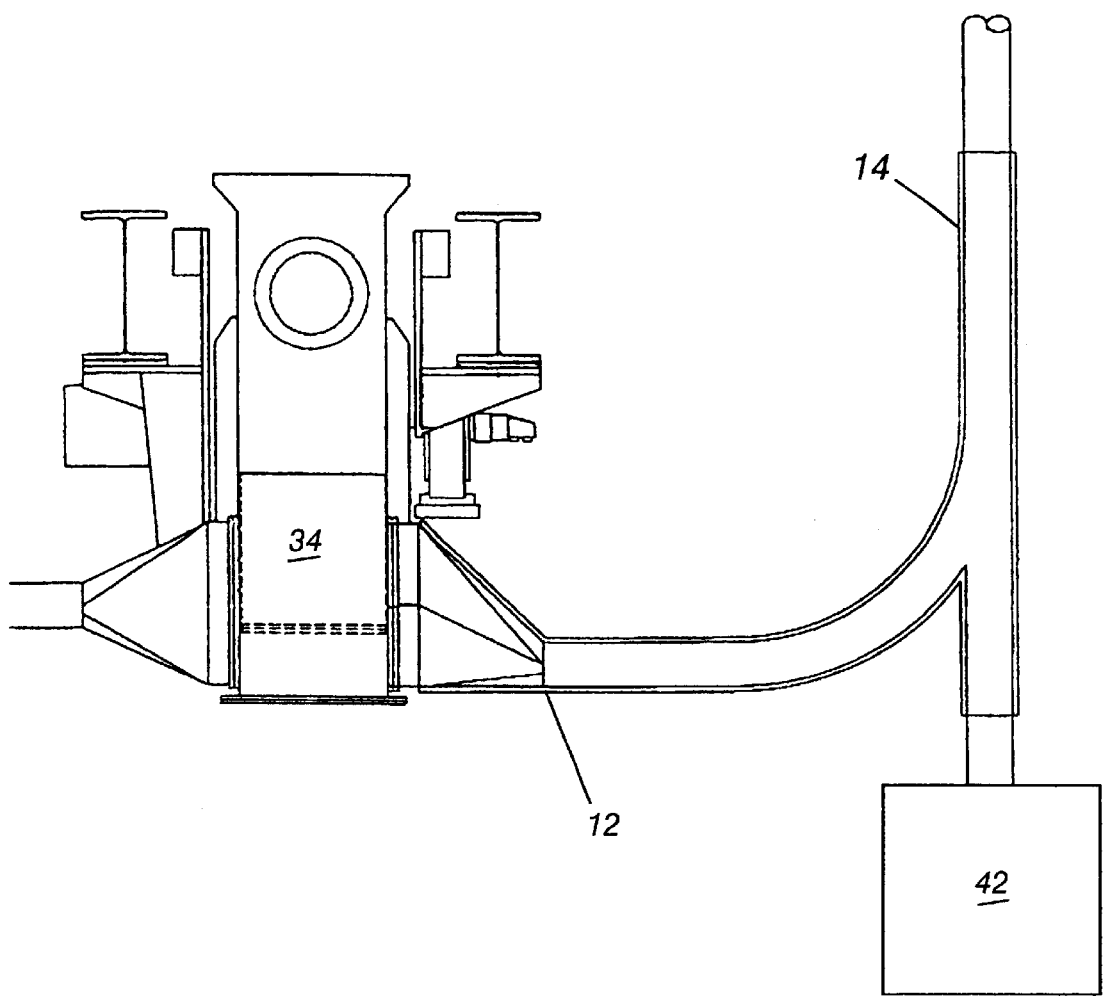
FIG. 2 is vertical cross-section of the fines collection chamber of the invention.
Figure 3:
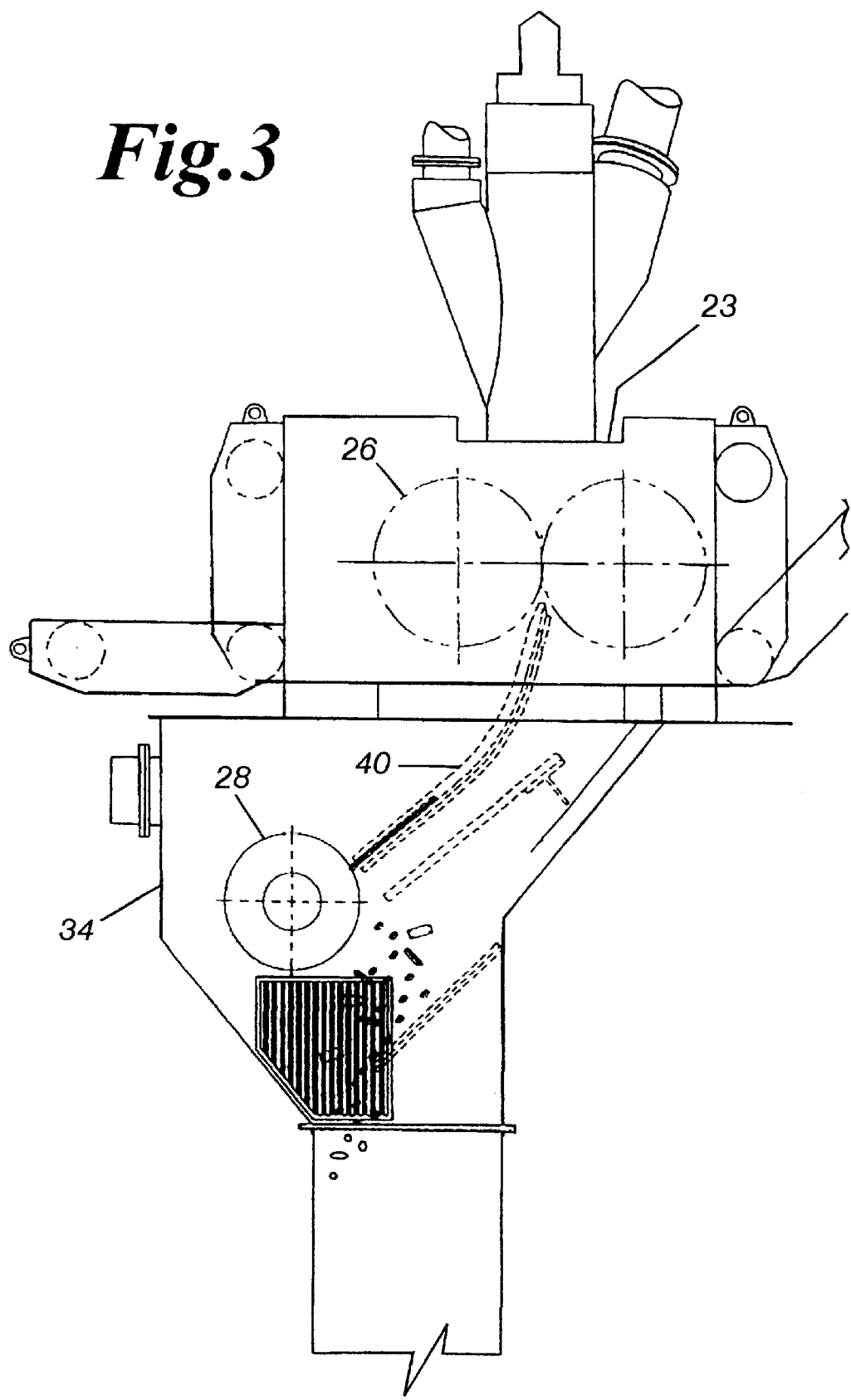
FIG. 3 is an enlarged view of a portion of FIG. 1.

Referring to FIG. 1, the method of the invention may be embodied in the apparatus 10, as shown. The gas used in the invented method is a gas that does not react with hot DRI, for example, an inert gas such as nitrogen or argon. Hot DRI is transferred by a conveying means 22, such as a screw conveyor to entry port 23 of a briquetting machine 24. Briquetting of hot DRI is accomplished by briquetting rolls 26, a roller press, or other compressing means. The briquettes are formed into a sheet 40 of attached briquettes, then are separated into individual briquettes by contact with breakers 28 located below the briquetting rolls 26. The act of breaking the briquettes apart creates fine particles, or "fines", which are substantially reduced iron. The fines are separated from the larger particles and recycled. The fines separation and recycling apparatus consists of a chamber 34, fines discharge nozzle 12, a pneumatic fines conveying conduit 14, a fines-gas separator 16, a wet scrubber 18, a compression blower 20, and associated conduits.

The fines are drawn from the chamber 34 housing briquette breaker 28 and into the associated fines discharge nozzle 12 by means of a negative pressure created by the blower 20. The fines are conveyed pneumatically through the pneumatic conveying conduit 14 and into the inlet 15 of the fines separator 16. The fines separator, which may be a cyclone or a hot gas filter, separates the fines from the inert conveyor gas, and the fines drop to the bottom of the separator 16 to be returned to the fines inlet 30 of the briquetting machine. The gas pressure within the fines separator is isolated from the screw housing by means of a rotary valve 22, double dump valve, trickle valve or other device which makes a seal. The gas is removed from the fines separator 16, via conduit 17, is cleaned in wet scrubber 18, compressed by means of compressor/blower 20 and reintroduced to the briquetting machine breaker housing inlet nozzle 36. A vent V, whith associated control valve 38 is provided downstream from the blower 20 to cause negative pressure to be maintained in the briquette machine 24. This negative pressure prevents fugitive dust emissions. Non-reactive makeup gas from source 32 is added as needed to the system before gas re-enters the briquetting machine breaker chamber.

The non-reactive gas is preferably nitrogen or a principally nitrogen gas, such as reformer seal gas, or it may contain argon or other inert gas. In the event that some small amount of air enters the system, the oxygen therein will be reacted in short order with hot components, or even with reducing agents in the briquette materials, leaving principally nitrogen in the gas.

A grid 44 may be provided on the fines exit side of the breaker chamber 34 which prevents the entrance of large particles or briquettes into the gas discharge nozzle 12. The briquettes fall downward by gravity for further handling, or into a briquette collector 46.

The process allows the size of the fines collected and recycled to be controlled by adjusting the velocity of gas in the fines discharge nozzle 12 and/or by changing the nozzle configuration. Conveying gas velocities are typically in the range of, but are not limited to, from 7 to 25 m/s, and fines discharge temperatures from the briquetting machine are typically in the range of, but are not limited to, from 600° C. to 750° C. Heat loss from the invented system is minimized by insulation on the conveying conduits and the cyclone 16. The gas cleaning efficiency of the fines separator is high, typically more than 99%. The percentage of fines recycled depends on the amount of conveying gas used. The pressure required at the blower egress depends on the nozzle, conveying conduits, fines separator, and scrubber configurations, as well as the solids to gas ratio in the conveying line 14. In the event of a pressure drop in the system, particles may fall to the bottom of vertical conveying line 14 and into a receptacle 42.

The invention solves the aforementioned problems by pneumatically separating the fines from the briquettes and conveying the fines back to a briquetting machine feed screw. The invention eliminates the need for a hot screen and a bucket elevator. The invented method has the added advantage of reducing the required height of a briquetting system in a greenfield hot briquetted iron (HBI) plant. Because the system is entirely closed, and inert gas is continually added, the problem of isolating the recycle mechanism from air associated with any presently known system is resolved. The only moving part involved with the gas is the blower 20, which is isolated from the dust and heat because the gas/fines separator 16 and the wet scrubber 18 are positioned upstream from the blower. The invented system thus is much less expensive than the known systems.

The invented system is also useful with briquetting of other materials, including coal, coke, and other metallic and oxide materials.

SUMMARY OF THE ACHIEVEMENT OF THE OBJECTS OF THE INVENTION

It is readily apparent from the foregoing that we have invented an improved method and apparatus for separating and recycling fines and shards that occur in the breaker chamber of a briquetting machine when such machine is used for briquetting hot, metallized iron bearing materials and that we have solved the reliability and maintenance problems associated with known briquetting methods.

It is to be understood that the foregoing description and specific embodiments are merely illustrative of the best mode of the invention and the principles thereof, and that various modifications and additions may be made to the method or apparatus by those skilled in the art, without departing from the spirit and scope of this invention, which is therefore understood to be limited only by the scope of the appended claims.

What is claimed is:

1. A method of recovering and recycling fines and shards of hot iron-containing materials that arise in the hot briquetting of iron-containing materials at temperatures exceeding 600° C., comprising:

a) separating said fines and shards from said briquettes in a breaker chamber of the briquetting machine, where said briquettes are individualized using breakers, by introducing an non-reacting gas into said chamber at sufficient pressure to entrain fines and shards and convey them out of said chamber through a fines discharge nozzle;

b) pneumatically conveying said fines and shards through said fines discharge nozzle to a gas/fines separator above said briquetting machine wherein said fines and shards are separated from said non-reacting gas;

c) introducing said separated fines and shards to an inlet of said briquetting machine;

d) conveying said separated non-reacting gas to a gas scrubber;

e) scrubbing said non-reacting gas in said scrubber and forming a cleaned and scrubbed non-reacting gas that is substantially free of residual fines or dust;

f) removing the scrubbed non-reacting gas and increasing the pressure of said non-reacting gas by means of a blower or compressor; and g) recirculating said non-reacting gas by reintroducing it into said chamber;

whereby said fines and shards are recovered for processing into hot iron-containing briquettes without exposure to air or substantial temperature reduction.

2. A method according to claim 1 wherein the hot iron-containing material is direct reduced iron.

3. A method according to claim 1, further comprising adding additional non-reacting gas to said non-reacting gas as make-up gas, as necessary.

4. A method according to claim 1 wherein the non-reacting gas is an inert gas.

5. A method according to claim 3 wherein the non-reacting gas is an inert gas.

6. A method according to claim 4 wherein the non-reacting gas is principally nitrogen.

7. Apparatus for recovering and recycling fines and shards of hot iron-containing materials that arise in the hot briquetting of iron-containing materials, comprising:

means for separating fines and shards from briquettes in a briquetting machine having a breaking chamber and briquette breakers therein;

pneumatic conveyor means for removing said fines and shards from said briquetting machine in a carrier gas;

a gas separator means above said briquetting machine for separating said fines and shards from said carrier gas, said gas separator being connected to said pneumatic fines conveyor means;

means for conveying and introducing said separated fines and shards from said separator to a material feed inlet of said briquetting machine;

a gas scrubber operatively connected to said gas separator for receiving and scrubbing the separated carrier gas;

conduit means associated with said scrubber for removing scrubbed gas therefrom that is substantially free of residual fines or dust; and a conduit for conducting the scrubbed gas to the breaking chamber for removing the fines and shards therefrom.

8. Apparatus according to claim 7, further comprising means associated with said means for conducting the removed gas to the breaking chamber for adding additional gas thereto.

9. Apparatus according to claim 7 further comprising means for separating larger fines and shards from said carrier gas within.

10. Apparatus according to claim 7 further comprising shielding means in said breaking chamber for preventing the entrainment of large particles in said carrier gas.

11. Apparatus according to claim 7 further comprising a source of non-reactive make-up gas connected to said conduit for conveying said carrier gas.

12. Apparatus according to claim 7 further comprising vent means in said conduit for maintaining negative pressure in said briquetting machine.

* * * * *